United States Patent [19]

Ueda et al.

[11] 4,142,787
[45] Mar. 6, 1979

[54] AUTOMATIC DIAPHRAGM CONTROL MECHANISM FOR A SINGLE LENS REFLEX CAMERA

[75] Inventors: Hiroshi Ueda, Nara; Akira Yoshizaki, Osaka, both of Japan

[73] Assignee: Minolta Camera Kabushiki Kaisha, Osaka, Japan

[21] Appl. No.: 752,234

[22] Filed: Dec. 20, 1976

Related U.S. Application Data

[63] Continuation of Ser. No. 559,868, Mar. 19, 1975, abandoned.

[30] Foreign Application Priority Data

Mar. 29, 1974 [JP] Japan .................................. 49-34744
Mar. 29, 1975 [JP] Japan .................................. 50-34745

[51] Int. Cl.² .......................... G03B 7/08; G03B 19/12
[52] U.S. Cl. ........................................ 354/38; 354/43; 354/47; 354/152
[58] Field of Search ............... 354/29, 30, 36, 152, 354/154, 43, 60, 42, 44, 47, 46, 270, 271, 38

[56] References Cited

U.S. PATENT DOCUMENTS

| | | | |
|---|---|---|---|
| 3,292,516 | 12/1966 | Sato et al. | 354/42 |
| 3,710,700 | 1/1973 | Nakono | 354/30 |
| 3,757,655 | 9/1973 | Kobayashi | 354/29 |
| 3,777,637 | 12/1973 | Kuramoto | 354/42 |
| 3,829,867 | 8/1974 | Ono | 354/29 X |
| 3,868,703 | 2/1975 | Ueda | 354/154 X |
| 3,871,005 | 3/1975 | Uchida et al. | 354/42 X |
| 3,891,992 | 6/1975 | Ueda et al. | 354/152 |
| 3,922,693 | 11/1975 | Matsui | 354/42 |
| 3,964,073 | 6/1976 | Kobori et al. | 354/38 X |

*Primary Examiner*—L. T. Hix
*Assistant Examiner*—William B. Perkey
*Attorney, Agent, or Firm*—Wolder, Gross & Yavner

[57] ABSTRACT

A mechanism for automatically controlling the diaphragm aperture of a single lens reflex camera in response to scene brightness, has a photo-electric element disposed within camera body outside the photographic light path to receive light coming from the scene through the objective and diaphragm aperture and reflected from light reflective surfaces of shutter curtain and/or film. After the reflex mirror has retracted from its viewing position, the diaphragm is gradually stopped down with the photo-electric element receiving scene light therethrough until a diaphragm control circuit detects a suitable diaphragm aperture and interrupts the stopping down operation. Exposure time may be controlled by an electric circuit in accordance with the output of the photoelectric element receiving scene light through the diaphragm aperture adjusted by the diaphragm control circuit.

15 Claims, 7 Drawing Figures

AUTOMATIC DIAPHRAGM CONTROL MECHANISM FOR A SINGLE LENS REFLEX CAMERA

This is a continuation of application Ser. No. 559,868, filed Mar. 19, 1975, now abandoned.

BACKGROUND OF THE INVENTION

The present invention relates generally to an automatic diaphragm control mechanism for a single lens reflex camera and it relates more particularly to a mechanism for detecting scene brightness through the objective of a camera, that is, of the TTL light measuring type.

The automatic diaphragm control mechanism of the subject nature has been described, for example, in U.S. Pat. No. 3,777,637. In the known device, a photo-electric element is disposed at the top of a pentagonal prism to receive scene light through the objective of the camera, and the diaphragm aperture previously opened fully for viewing, is stopped down gradually by a diaphragm driving mechanism operable substantially in the same manner as performed by a conventional mechanism for driving the diaphragm to a pre-set value prior to shutter opening. Accordingly, the known mechanism can be so constructed as to accept ordinary interchangeable objective lenses adapted for the conventional diaphragm driving mechanism without requiring any particular additional structure for the automatic diaphragm control. However, the known mechanisms possess the disadvantages that the automatic diaphragm adjusting must be carried out before the reflex mirror of the camera moves from its viewing position, because the photo-electric element receives light via the reflex mirror. In other words, the known mechanisms determine the diaphragm aperture in accordance with scene light detected some time, but not immediately before the shutter actuation, because of the time consumed by the mirror operation. Further, in the known devices, the light measurement is frequently influenced by unnecessary stray light entering through the eyepiece.

SUMMARY OF THE INVENTION

The primary object of the present invention is to provide an improved mechanism or device for automatically controlling a diaphragm in accordance with scene light detected immediately before the shutter actuation.

Another object of the present invention is to provide an improved automatic diaphragm control device which detects scene light through the camera objective without being influenced by the stray light from the eyepiece.

To attain this object, the present invention employs a light measuring system in which a photo-electric element is disposed within camera body or at the back of the object, and outside of photographic light path to receive light reflected by reflective surfaces of the shutter curtain and/or film which have the same reflective powers. These measuring systems, per se, have been proposed, for example in U.S. Pat. Nos. 3,687,026, 3,730,063 and 3,791,276. However, it should be noted that these patents do not suggest the employment of the automatic diaphragm control device in the manner as is described and claimed in the present application.

In earlier devices, exposure time is usually set manually and controlled in accordance with the setting, even if scene brightness is too high or too low to provide suitable exposure through the combination of the set exposure time and any available diaphragm aperture. Hence, it is desirable if the exposure time is automatically adjusted for such too high or too low scene light.

Accordingly, it is still another object of the present invention to provide the automatic diaphragm control mechanism in which exposure time is automatically adjusted when the scene light is so high or low as to require a diaphragm aperture not available for the camera.

It is a further object of the present invention to provide an improved automatic diaphragm control device which can provide various programs of exposure control.

The above and other objects of the present invention will become apparent from a reading of the following description taken in conjunction with the accompanying drawings, wherein.

DESCRIPTION OF THE PREFERRED EMBODIMENTS

Figure 1:
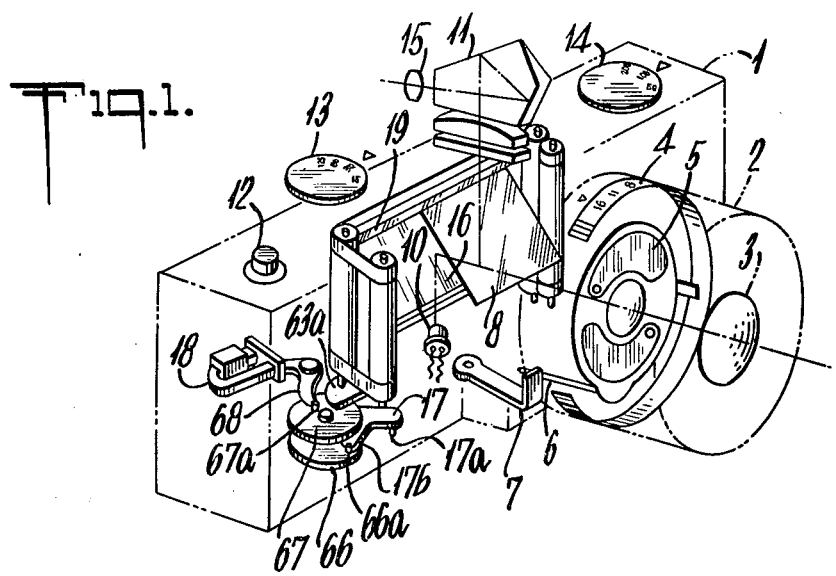
FIG. 1 is a schematic perspective view of a single lens reflex camera.

Referring now to FIGS. 1 to 5 which illustrate a preferred embodiment when, in response to depression of a shutter button 12, a moveable mirror 8, which is operatively coupled to the shutter button 12, is swung out of the photographic light path to the horizontal position to prevent the light from entering a camera 1 (indicated by the two dot chain lines), through an eyepiece 15, the light from a subject traversing the taking lens 3 of an interchangeable objective lens 2 (indicated by the two dot lines), which is detachably mounted upon the camera body 1, is reflected by the surface of a first curtain 16 of the camera focal plane shutter, and impinges on a photo-electric element 10 positioned at the bottom or side wall of the mirror box within the camera body out of the path of the light beam falling upon and facing the film. The photo-electric element 10 is preferably a high responsive device, for instance, a silicon photodiode or the like. The output of the photo-electric element 10 is applied to an aperture control circuit shown in FIG. 2.

As seen in FIG. 1, a diaphragm aperture pre-set member 7 is shown as being in the charge position. When the mirror 8 is swung up upon depression of the shutter button 12, so as to light isolate the photo taking chamber in the camera body from the viewfinder, the aperture pre-set member 7 is released from its charge position so that a diaphragm 5, which is initially at maximum aperture may be stopped down to an aperture pre-set by a diaphragm aperture pre-set ring 4 or to an aperture determined by an aperture control electromagnet 20 which is energizable by the output from the aperture control circuit. After the optimum aperture for the film speed set by the film sensitivity setting dial 14 and a pre-set shutter speed has been set, the first curtain 16 is released from a first blind holding member 17, so that the first curtain 16 starts to travel, whereby the exposure is initiated.

As soon as the exposure is initiated, a conventional electronic shutter control circuit is actuated so that after lapse of a pre-set exposure time an electromagnet 18 is energized to release a second curtain. Therefore, a second curtain 19 starts to travel, whereby the exposure is terminated.

Figure 2:
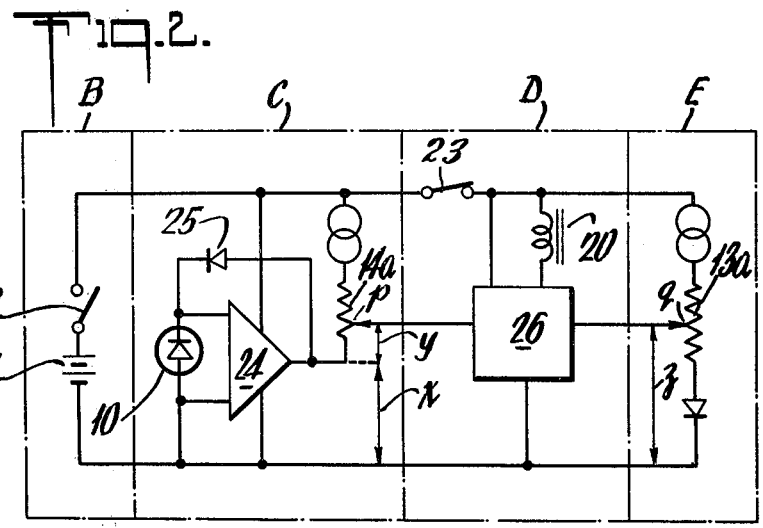
FIG. 2 is a circuit diagram of the first embodiment of the present invention.

The diaphragm control system as shown in FIG. 2 comprises, in general, a power supply circuit B including a power source or battery 21, and a power switch 22 which is connected in series with the power source 21 and is adapted to be closed in response to the shutter release operation; a light responsive circuit C connected to the power supply circuit B and including a photoelectric element 10; an aperture control circuit D including an electromagnet 20, a differential switching circuit 26, and an aperture retaining switch 23 inserted between the power supply circuit B and the electromagnet 20; and a manual setting circuit E including a variable resistor 13a whose value is determined as a function of a position of the shutter speed dial 13.

The light responsive circuit C comprises an operational amplifier 24 deriving its input from the output of the element 10 without impressing any voltage across it, and a diode 25 for processing the output of the element 10 into an electric signal suitable for electrically executed photographic calculation under the APEX system. The light responsive circuit C, therefore, produces a voltage x as a logarithmic compression of the brightness of the light coming from the subject and incident on the photo-electric element 10. Connected in series with the diode 25 is a variable resistor 14a whose value is varied by the film sensitivity setting dial 14 shown in FIG. 1. Therefore, the sum of the potential y across the variable resistor 14a and the potential x; that is, (x + y) appears at the point P as the output of the light responsive circuit C, and is applied to one input terminal of the switching circuit 26 in the aperture control circuit D.

The variable resistor 13a, which is set by the shutter speed dial 13, is connected through a diode to the power supply circuit B, and the potential z at the point q is applied to another input terminal of the differential switching circuit 26.

As the pre-set member 7 causes the diaphragm 5 to be stopped down, the brightness at the light receiving surface of the photo-electric element 10 decreases gradually. Therefore, the potential at the point p also decreases. And when the difference between the potential (x + y) (at the point p) and the potential z (at the point q) becomes zero, the aperture control electromagnet 20, which has been energized through output circuit of the differential switching circuit 26, is de-energized, and the de-energization of this electromagnet 20 interrupts the operation of the aperture pre-set member 7, which has been causing the diaphragm 5 to stop down, so that the stopping down operation may be interrupted, thereby setting and holding the optimum aperture as will be described in more detail hereinafter.

When the output of a time constant circuit (not shown), which is actuated in the conventional manner in response to the potential z at the point q which in turn is set by the shutter speed dial 13, reaches a predetermined level, a switching circuit in the shutter control circuit is actuated so that the electromagnet 18 is de-energized, so that the second curtain 19 is released from its charged position and starts to travel, thereby terminating the exposure. Thus, the exposure time may be controlled.

Figure 3:
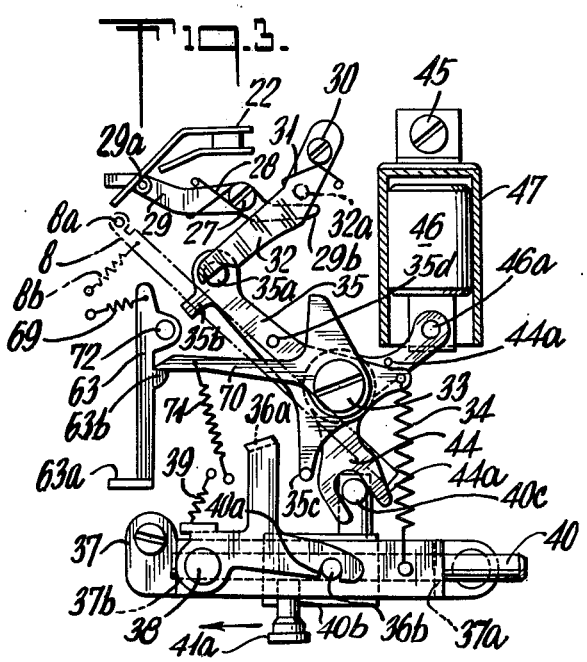
FIG. 3 is a side elevational view of the control mechanism.
Figure 4:
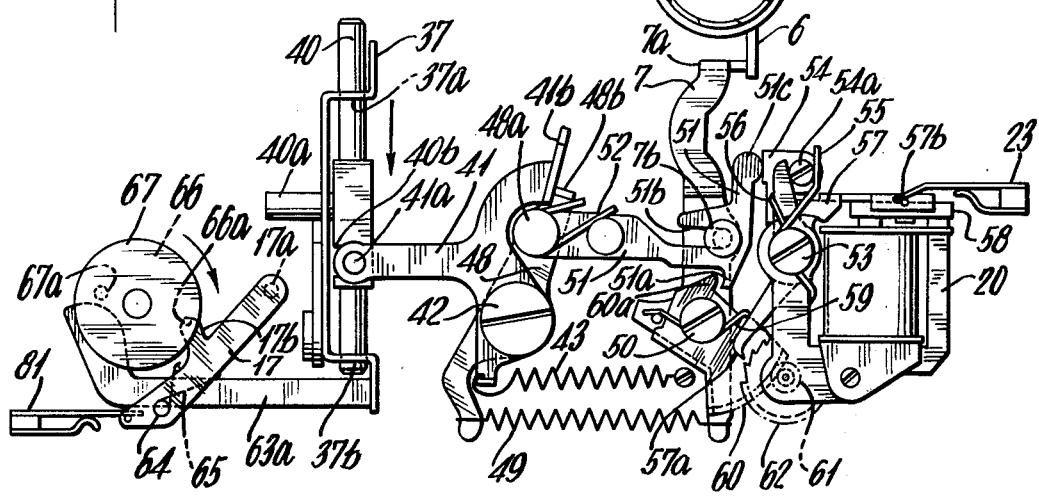
FIG. 4 is a plan view of the bottom portion of the control mechanism.

FIGS. 3 and 4 show the mechanisms located at the side wall and the bottom respectively, of the mirror box in the condition immediately before the shutter release operation is to be started after the shutter has been charged.

When the shutter release button 12 is depressed with the film sensitivity setting dial 14 being set depending upon the speed of the film used, an aperture pre-set ring of the interchangeable lens being set to the minimum aperture, and the shutter speed dial 13 being set to a desired shutter speed, a release lever 29 which is rotatably carried by a shaft 27, which in turn is attached to the side wall of the mirror box, and is biased to rotate in the clockwise direction by a spring 28, is caused to rotate in the counter-clockwise direction, so that an electrically insulating pin 29a at one end of the release lever 29 causes the power switch 22 which has been opened against its resilient closing bias to close, thereby energizing the aperture control electromagnet 20. Concurrently the other end 29b of the release lever 29 engages a pin 32a extending from a mirror stopping lever 32 to cause the latter to rotate about its axis 30 in the clockwise direction against the influence of a spring 31, so that the rotation in the clockwise direction of a mirror driving member 35 may be permitted. The mirror driving member 35 is rotatably carried by a shaft 33, and is biased to rotate in the clockwise direction under the force of a spring 34. A pin 35a with a semicircular profile portion at one end of the mirror driving member 35 engages the mirror stopping lever 32 to limit its rotation in the counter-clockwise direction. However, when the shutter release button is depressed, the pin 35a is released from the shutter stopping lever 32 as the latter is rotated in the clockwise direction so that the mirror driving lever 35 is caused to rotate in the clockwise direction under the force of the spring 34, as described above. The mirror driving member 35 has a holding arm 35b for holding the mirror which is rotatably carried by its shaft 8a within the mirror box and is normally biased to the 45° position under the influence of a spring 8b. The mirror driving member 35 has also a pin 35d for engagement with a return lever 70, to be described hereinafter, and a pin 35c which engages an engaging portion 36a of an engaging member 36 of a driving system to be described hereinafter when the mirror driving member 35 is rotated in the clockwise direction, thereby releasing the engaging member 36.

When the power switch 22 is closed and the mirror driving member 35 is released from the mirror stopping lever 32, the mirror driving member 35 is rotated in the clockwise direction so that the mirror 8 is retracted from its 45° advanced viewing position at which the mirror 8 intersects at 45° the optical axis of the taking or objective lens to the horizontal or retracted photographing position. Immediately before the completion of the rotation of the mirror 8, the pin 35c of the mirror driving member 35 releases the engaging member 36 in the driving system. In the above shutter release operation, even when the depression of the shutter button 12 is interrupted after it has been once depressed, the pin 35a of the mirror driving member 35 is kept in engagement with the arm 29b of the release lever 29 as the mirror driving member 35 is rotated in the clockwise direction, so that the release lever may be held in the counter-clockwise rotated position, and the power switch 22 thereby kept closed.

The diaphragm driving system includes a slide rod 40 slideably fitted in guide holes 37a and 37b formed in a mounting plate 37 which in turn is attached to the side wall of the mirror box. A pin 40a of the slide rod 40 is engageable with a hook portion 36b, at the charged position, of the engaging member 36 which is rotatably carried by a shaft 38 attached to the mounting plate 37, and is biased to rotate in the clockwise direction by a spring 39. As described above, when the mirror driving member 35 is rotated so that its pin 35c causes the engaging member 36 to rotate in the counter-clockwise direction, the hook portion 36b is released from the pin 40a of the slide rod 40.

As will be described in more detail with reference to FIG. 4, a drive lever 41, which has a pin 41a in engagement with a cut-out portion 40b of the slide rod 40, biases the slide rod 40 in the direction indicated in FIG. 3 from its charged position. A connecting pin 40c located on an arm extending from the slide rod 40 is in engagement with a fork portion 44a of a delay lever 44.

The delay lever 44 is rotatably carried by the shaft 33 of the mirror drive member 35, and has one end pivoted by a pivot pin 46a to the lower end of a piston 46 slideably fitted in a cylinder 47 of an air damper pivoted by a pivot pin 45 to the side wall of the mirror box. Therefore, when the sliding rod 40 is displaced from its charged position in the direction indicated by the arrow, its displacement speed is controlled by the air damper.

The drive lever 41, which is rotated to drive the slide rod 40, is carried by a shaft 42 which in turn is journalled to the bottom of the mirror box, as shown in FIG. 4, and is normally biased to rotate in the counter-clockwise direction under the force of a drive spring 43 loaded between the drive lever 41 and the bottom of the mirror box. A lever 48 is also carried by the shaft 42 and is biased to rotate in the counter-clockwise direction under the force of a spring 49. The lever 48 has a bent portion 48b engageable with a bent portion 41b of the driving lever 41. A connecting lever 51 is rotatably carried by a shaft 48a attached to the lever 48 and is biased to rotate in the clockwise direction under the force of a spring 52.

The aperture pre-set lever 7, which is rotatably carried by a shaft 50 attached to the bottom of the mirror box, has one arm engaging the other end of the spring 49, and a pin 7b at the other arm in engagement with a U-shaped slot 51b of the connecting lever 51, thereby forming a loop-shaped moving structure as a whole. The spring 49 imparts sufficient force to the pre-set lever 7 so that the latter may overcome the load exerted on the connecting pin within the interchangeable lens 2. The loop-shaped moving body is biased to rotate about the shafts 42 and 50 in the counter-clockwise direction under the influence of the springs 49 and 52.

A segment gear 60 is rotatably carried by the shaft 50 of the aperture pre-set lever 7, and is normally biased to rotate in the clockwise direction by a spring 59 loaded between the segment gear 60 and the pre-set lever 7. The segment gear 60 has a hook portion 60a engageable with a hook portion 51a of the connecting lever 51. When the loop-shaped moving structure is caused to rotate in the counter-clockwise direction as earlier described, the hook portions 51a and 60a engage each other so that the segment gear 60 is rotated in the counter-clockwise direction against the spring 59. A ratchet wheel 62 and a pinion 61 in mesh with the segment gear 60 are carried by the same shaft attached to the bottom of the mirror box so that the ratchet wheel 62 is rotated in the clockwise direction when the segment gear 60 is rotated in the counter-clockwise direction.

When the shutter charging step is performed, a raised portion 51c formed integral with one end of the connecting lever 51 is brought into engagement with a stroke error absorbing lever 54 rotatably carried by a shaft 53 attached to the bottom of the mirror box and normally biased to rotate in the counter-clockwise direction under the relatively strong force of a spring 55. A stop lever 57 is rotatably carried by the shaft 53, and is biased to rotate in the clockwise direction by a relatively weak spring 56. One arm of the stop lever 57 has an armature 58 to be attracted by the electromagnet 20 and a pin 57b which opens the normally closed aperture holding switch 23 when the stop lever 57 is rotated in the counter-clockwise direction. The second arm (upwardly extended in FIG. 4) of the stop lever 57 is engageable with an eccentric pin 54a of the lever 54 while the third arm (downwardly extended in FIG. 4) terminates in a pawl 57a for engagement with the ratchet wheel 62.

In the charged position the lever 54 is caused to rotate in shutter charging process in the clockwise direction by the connecting lever 51 so that the eccentric pin 54a may be retracted from the second arm of the stop lever 57, and the armature 58 is pressed against the core of the electromagnet 20 under the force of a relatively weak spring 56, although the eccentric pin 54a is shown in FIG. 4 to be engaged by the second arm of the stop lever.

Figure 5:
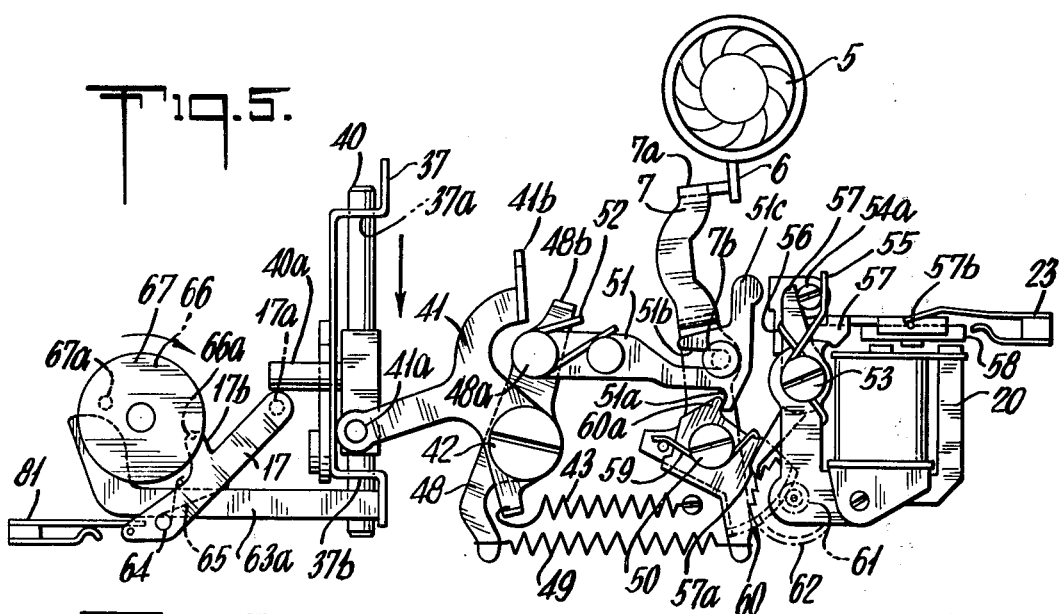
FIG. 5 is a plan view of the same portion as FIG. 4, but showing the condition thereof after the shutter is released.

Considering now the operation of the mechanism described above, when the power switch 22 is closed first by the rotation of release lever 29, the armature 58 is attracted by the electromagnet 20 at the above mentioned pressed position. Toward the end of the rotation of the mirror 8, the sliding rod 40 which has been retained by the engaging member 36, is released from its charged position and is displaced by the driving lever 41. Concurrently, with the displacement of the slide rod 40, the loop-shaped moving structure is rotated in the counter-clockwise direction so that the raised portion 51c is released from the lever 54. Therefore, the lever 54 is slightly rotated so that the eccentric pin 54a engages the stop lever 57. Since the armature 58 is attracted by the electromagnet 20, the rotation of the lever 54 is stopped, but the loop-shaped moving body continues to rotate at a slow speed. Therefore, the segment gear 60 and hence the ratchet wheel 62 are rotated, and the pre-set lever 7 coupled through a connecting pin 6 to the diaphragm 5 causes the latter to stop down gradually. As the diaphragm 5 is stopped down, the light passing through the aperture thereof and reflected from the first curtain 16 and impinging on or intercepted by the photoelectric element 10 decreases so that the potential (x + y) at the point p in FIG. 2 drops gradually and finally equals the potential z at the point q. As a result, the differential switching circuit 26 de-energizes the electromagnet 20 so that the stop lever 57 and the lever 54 are rotated in the counter-clockwise direction as shown in FIG. 5 under the force of the strong spring 55. The pawl 57a engages with the ratchet wheel 62 to stop its rotation. The rotation of the loop-shaped moving structure is thus also stopped so that the aperture stopping motion of the diaphragm 5 by the aperture pre-set member 7 is interrupted to determined the aperture. Concurrently, the aperture holding switch 23 is opened so that the aperture pre-set member 7 is stopped and held in the position for the determined aperture.

While the loop-shaped moving body remains stationary after the above operation has been accomplished, the driving lever 41 continues its rotation in the counter-clockwise direction as indicated in FIG. 5, so that the slide rod 40 is displaced in the direction indicated by the arrow. Consequently, the pin 40a of the slide rod 40 is advanced into engagement with a pin 17a of a first curtain retaining lever 17 which is rotatably attached with a shaft 64 to the bottom of the camera main body and is biased to rotate in the counter-clockwise direction under the force of a spring 65 so that the first curtain or blind engaging lever 17 is caused to rotate in the clockwise direction against the spring 65 so that its engaging arm 17b is released from the engagement with an engaging pin 66a of a first blind gear 66. Thus, the travel of the first curtain blind 16 is started to initiate the exposure. Concurrently, the first curtain retaining lever 17 actuates the time constant circuit in the shutter control circuit.

The current representative of the logarithmic expansion of the potential z at the point q of the variable resistor 13a, which is set by the shutter speed dial 13, flows through the time constant circuit. When output voltage of the time constant circuit rises to a predetermined level, the switching circuit is actuated so that the shutter control electromagnet 18 is de-energized.

Referring back to FIG. 1, a second curtain retaining lever 68 is released by the de-energization of the electromagnet 18 from the engagement with an engaging pin 67a of a second curtain or blind gear 67, so that the second curtain 19 starts travelling, thus terminating the exposure. Immediately before the end of the stroke of the second curtain 19, the engaging pin 67a of the second blind gear 67 engages a bent portion 63a of a return stop member 63 which, as shown in FIG. 3, is rotatably attached by a shaft 72 to the side wall of the mirror box and is biased to rotate in the counter-clockwise direction by a spring 69. Therefore, as shown in FIG. 5, the return stop member 63 is caused to rotate in the clockwise direction against the influence of spring 69 so that its engaging pawl 63b is released from the return member 70.

As shown in FIG. 3, the return member 70 is rotatably carried by the shaft 33 together with the mirror driving member 35 and the slow speed lever 44, and is biased to rotate in the counter-clockwise direction by a relatively strong spring 71. When the pawl 63b is released from the return member 70, the latter is caused to rotate in the counter-clockwise direction to engage the return pin 35d of the mirror driving member 35, whereby the latter is caused to rotate in the counter-clockwise direction. Therefore, the mirror 8 is returned from the horizontal photographing position to the initial 45° viewing position. The mirror driving member 35 also engages with the pin 44b of the delaying lever 44 so that the latter is caused to rotate in the counter-clockwise direction to its initial position. Consequently, the air damper piston 46 is returned to its initial position, and the slide rod 40 is also returned to its intitial position against the influence of spring 43.

When the slide rod 40 is returned to its initial position, its engaging pin 40a is released from the first curtain retaining lever 17 so that the latter is also rotated in the counter-clockwise direction in FIG. 5 under the force of the spring 65 to return its initial position.

When the drive lever 41 is rotated in the clockwise direction in FIG. 5, its bent portion 41b pushes the lever 48 to rotate in the clockwise direction, whereby the loop-shaped moving body is caused to rotate in the clockwise direction. As a result, the aperture pre-set member 7 is caused to rotate in the clockwise direction under the force of the spring 49 so that the diaphragm 5 is fully opened again.

During the return movement of the aperture pre-set member 7, the pawl 57a of the stop lever 57 remains in engagement with the ratchet wheel 62 so that the return of the segment gear 60 to its initial position is not initiated. The raised portion 51c of the connecting lever 51 is urged into engagement with the lever 54 immediately before the completion of the rotation in the clockwise direction of the loop-shaped moving body so that the connecting lever 51 causes the lever 54 to rotate in the clockwise direction. Concurrently, the stop lever 57 is rotated in the clockwise direction under the force of the spring 56 so that the pawl 57a is disengaged from the ratchet wheel 62 and the armature 58 is pressed against the electromagnet 20 under a predetermined pressure. Thereafter, with the shutter charging operation, film is transported by one frame length, and the shutter is charged so that all of the component parts are returned to their initial positions shown in FIG. 3.

In the mechanism described above, not only may the exposure be achieved by the manual setting of the aperture pre-set ring 4 and the shutter speed dial 13, but also the exposure in which the aperture is automatically controlled in response to the pre-set shutter speed may be accomplished by setting the minimum aperture by the aperture pre-set ring 4 and by pre-setting the shutter speed by the shutter speed dial 13. In the latter case, the exposure time control, except for the pre-set shutter speed control is not carried out, but the aperture control circuit D controls the optimum aperture in response to the selected shutter speed, the speed of the film used, and the brightness of the subject immediately before the exposure is made. When the optimum exposure cannot be attained even though the minimum or maximum aperture is set because the subject is too bright or too dark, the exposure with the minimum or maximum aperture is made as the second best exposure. The automatic and instantaneous determination of the aperture is made after the moveable mirror is swung up to block all the light including the light rays from the eyepiece of the viewfinder, but except for the light rays from the subject, so that there is no error at all in the determined aperture. The photo-electric element can be securely positioned within the camera body, and need not be displaced at all upon film exposure so that the TTL type instantaneous automatic aperture determination may be accomplished without the camera being of complex construction.

Figure 7:
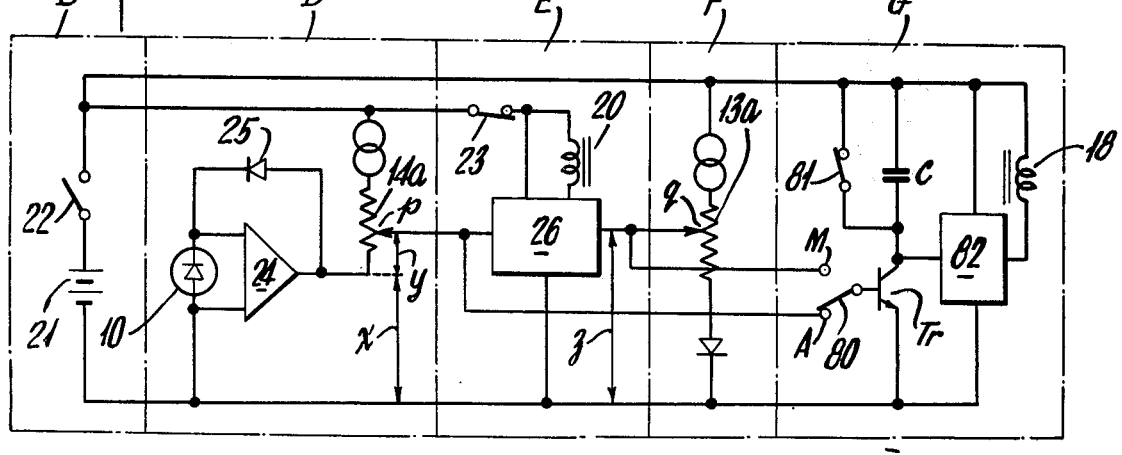
FIG. 7 is a circuit diagram of the second embodiment.

FIG. 7 is a circuit diagram of another embodiment of the present invention which has, in addition to the circuit of FIG. 2, a shutter control mode selecting switch 80 and a shutter control circuit for automatically controlling the exposure time in response to the output of the light measuring circuit D, which is representative of the intensity of light incident on the photo-electric element 10 coming from the subject through a diaphragm aperture stopped down to a value determined automatically by the diaphragm control circuit of FIG. 2, or set manually with the diaphragm aperture pre-set ring 4.

In the circuit of FIG. 7 in which the same numerals or characters are used for like elements or parts as of FIG.

2, the manual control contact M in the selection switch 80 of the shutter control circuit G is closed, the potential z at the point q which is set by the shutter speed dial 13 is applied to the base of the transistor Tr in the shutter control circuit G. However, when the automatic control contact A is closed as shown in FIG. 7, the potential (x + y) at the point p; that is the sum of the potential x representative of the logarithmic compression of the value or measure of the brightness of the subject, which measure is dependent upon the aperture defined by the diaphragm 5, and the potential y across the variable resistor 14a which is set by the film sensitivity setting dial 14, is applied to the base of the transistor Tr. The output current, the magnitude of which is dependent upon the potential applied to the base of the transistor Tr, flows between the collector and emitter of the transistor Tr, and a capacitor C is charged by the current when a trigger switch 81, which is connected in parallel with the capacitor C, is opened in response to the start of the first shutter curtain. When the voltage across the capacitor C reaches a predetermined level, the switching circuit 82 is actuated to de-energize the electromagnet 18 so that the second shutter curtain 19 is released from its charged position to start to travel, thereby terminating the exposure. Thus, the exposure time may be controlled automatically.

The mechanical parts of the second embodiment are substantially similar to those of the first embodiment, except the arrangement of the trigger switch 81 which is normally closed, but is opened by the first curtain retaining lever 17 when the exposure is started.

When the selection switch 80 closes the automatic control contact A, the potential (x + y) at the point p produced when the light from the subject passing through the aperture defined by the diaphragm and reflected by the first blind 16 and then by the exposed film, is intercepted by the photo-electric element 10, is applied to the base of the transistor Tr. However, when the manual control contact M is closed, the potential z at the point q of the variable resistor 13a which is set by the shutter speed dial 13 is applied to the base of the transistor Tr. The collector current of the transistor Tr, which represents the logarithmic expansion of the input voltage, charges the capacitor C. When the voltage across the capacitor C reaches a predetermined level the switching circuit 82 is actuated to de-energize the shutter electromagnet 18.

Therefore, the second curtain retaining lever 68 is released from the engaging pin 67a of the second blind gear 67 (See FIG. 1) so that the second curtain 19 starts travelling, thereby terminating the exposure. Immediately before the end of the stroke of the second blind 19, the engaging pin 67a of the second curtain or blind gear 67 engages with the bent portion 63a of the return stop member 63 so that the latter is rotated in the clockwise direction against the influence of spring 69. As a result, the return member 70 is released from the engaging pawl 63b, causing the return operation of the mirror driving mechanism in the manner earlier explained with respect to the first embodiment. In the return operation the mirror drive member 35 engages and pushes the pin 44b of the slow speed lever 44, so that the latter is rotated in the counter-clockwise direction. Consequently, the air damper piston 46 is also returned to its initial position, and the slide rod 40 is returned against the influence of driving spring 43 in the direction opposite to the direction indicated by the arrow to its initial position.

As the slide rod 40 is returned, the first curtain retaining lever 17 is released from the engaging pin 40a of the sliding rod 40 so that the first curtain retaining lever 17 is rotated in the counter-clockwise direction under the force of the spring 65. Consequently, the trigger switch 81 is closed so that the capacitor C is discharged.

In the last embodiment with the above described construction, not only the manual setting of the aperture as well as the shutter speed is possible by the aperture pre-set ring 4, and the shutter speed dial 13, but also the exposure with the aperture being automatically controlled, depending upon a pre-set shutter speed, is possible by setting the diaphragm aperture to the minimum value by the aperture pre-set ring 4, selecting the manual control contact of the selection switch 80, and setting a desired shutter speed by the shutter speed selecting knob 13. In the latter case, the exposure time control, except for controlling the shutter speed pre-set is not made, but the aperture control circuit E sets the optimum aperture depending upon the pre-set shutter speed and the film speed and the brightness of the subject. When the optimum exposure cannot be attained even with the minimum or maximum aperture because the subject is too bright or too dark, the exposure with the minimum or maximum aperture is made as the second best exposure.

When the automatic control contact A of the switch 80 is closed, the optimum aperture with respect to the shutter speed pre-set by the shutter speed dial 13 may be set automatically when the brightness of the subject is within such a range that the optimum exposure is possible by controlling the aperture. However, when the over-exposure is expected even with the minimum aperture, the optimum shutter speed faster than the pre-set shutter speed may be automatically attained to provide proper exposure. On the other hand, when the under-exposure is expected even with the maximum aperture, the optimum shutter speed slower than the pre-set shutter speed may be automatically attained also to provide proper exposure.

Figure 6:
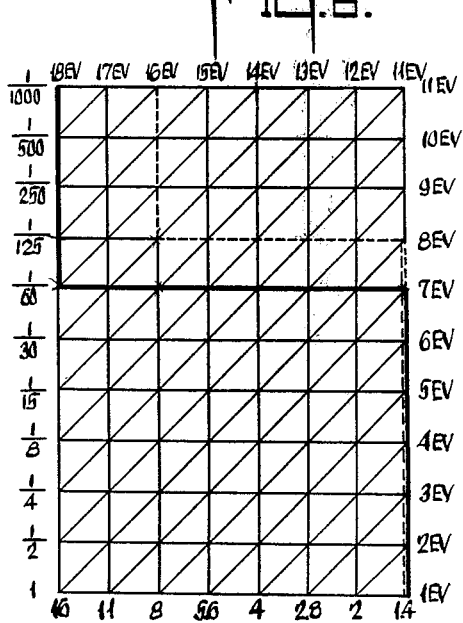
FIG. 6 is a diagram showing the parameter programs of a second embodiment of the present invention.

The mode of operation of the second embodiment will be described in more detail hereinafter with reference to FIG. 6. Assume that the shutter speed 1/60 sec. is selected and the aperture pre-set ring 4 be set to F:16. When the EV (exposure value of APEX system) of the subject is between 7 and 4, the exposure is made with the shutter speed of 1/60 sec. and the aperture suitably controlled between the minimum aperture 16 and the maximum aperture 1.4. When the EV is over 14 so that the over-exposure results with set shutter speed 1/60 the aperture is set to the minimum 16 while the optimum shutter speed is automatically selected beyond or faster than 1/60 toward the fastest shutter speed. When the under-exposure is expected, the aperture is set to 1.4 while the optimum shutter speed beyond 1/60 sec. is automatically selected. That is, the programming indicated by the solid lines in FIG. 6 is selected. When the shutter speed is pre-set to 1/125 sec. with the aperture pre-set ring set to F:8 and when the exposure value EV is between 8 and 13, the aperture is automatically selected between the maximum aperture 1.4 and the pre-set aperture 8. However, when the exposure value EV is over 13, the aperture is kept to the pre-set aperture 8 while the shutter speed is automatically selected beyond the pre-set shutter speed 1/125 sec. When the light value EV is under 8, the aperture is automatically set to the maximum aperture 1.4 while the shutter speed is automatically selected to a value slower than the pre-set shutter speed 1/125 sec. The above mode of control is indicated by the broken lines in FIG. 6.

According to the last described embodiment of the present invention, when one pre-sets the shutter speed and the aperture by the aperture pre-set ring and the shutter speed ring, the exposure in which both the shutter speed and the aperture are automatically controlled according to his intended program may be possible, while making the full use of the available shutter speeds of the camera and the speed of the interchangeable lens and its aperture setting mechanism. Therefore, the exposure permissible brightness range may be considerably increased. The various programs may be suitably selected by a photographer by manually pre-setting the shutter speed and the aperture of the interchangeable lens, for example, in order to avoid influence of the camera movement during exposure when the camera is hand held.

While there have been described and illustrated preferred embodiments of the present invention, it is apparent that numerous alterations, omissions and additions may be made without departing from the spirit thereof.

We claim:

1. In a single lens reflex camera provided with an objective lens having an adjustable diaphragm and a film disposed at the predetermined focal plane of said objective lens, which camera includes a mirror movable between a viewing position for directing light from a scene to be photographed to a view finder and a picture taking position for permitting said light traversing said objective lens and diaphragm to travel toward said focal plane, means for driving said mirror to the picture taking position from the viewing position in response to a manual release operation, and shutter means including first and second blind members which are respectively biased from cocked positions to rest positions and disposed in front of said focal plane so that said first blind member in its cocked position and said second blind member in its rest position block said light from said film and so that said light is permitted to expose said film when said first blind member is released from said cocked position for movement with said second blind member maintained in its cocked position, the surface of said first blind member having a reflectively substantially equal to that of said film;

an automatic exposure control device comprising:

diaphragm control means movable from an initial position to a terminal position for varying the aperture size of said diaphragm, after the completion of the movement of said mirror to its picture taking position;

manual diaphragm setting means for presetting a first position at which said diaphragm control means is stopped;

means for manually selecting a shutter speed and for generating a first output responsive to the selected shutter speed;

means for releasing said first blind member to start the movement thereof to its rest position, after the completion of the movement of said diaphragm control means;

a light measuring circuit having light responsive means disposed for receiving said light traversing said objective lens and said diaphragm and then reflected from at least one of the surfaces of said first blind member and said film, said light measuring circuit generating a second output commensurate with the intensity of said light which in turn is commensurate with the brightness of the scene to be photographed and the aperture size of said diaphragm being varied;

automatic diaphragm setting means for determining a second position, in which said diaphragm control means is stopped, in accordance with the first and second outputs, both said automatic diaphragm setting means and manual diaphragm setting means being independently effective so that said diaphragm control means is stopped at said first position when said first position is between said initial position and said second position and at said second position when said second position is between said initial position and said first position; and first shutter speed control means for starting the movement of said second blind member to its rest position at a time responsive to the second output, for determining a shutter speed to be actually effected.

2. An automatic exposure control device as defined in claim 1, further comprising:

second shutter speed control means for starting the movement of said second blind member at a timing dependent on the first output; and means for alternatively selecting one of said first and second shutter speed control means.

3. An automatic exposure control device as defined in claim 2, wherein said automatic diaphragm setting means includes:

a differential amplifier having a pair of input terminals to which said first and second outputs are fed and adapted to generate a signal when said first and second outputs are balanced with each other;

electromagnetic means acutated in response to said signal; and means for restraining said diaphragm control means at said second position in the course of its movement to said terminal position in response to the actuation of said electromagnetic means when said second position to be determined is between said initial position and said first position.

4. An automatic exposure control device as defined in claim 3, wherein said restraining means includes a ratchet gear and a pawl which interengage to stop the movement of said diaphragm control means in response to the actuation of said electromagnet means.

5. An automatic exposure control device as defined in claim 4, wherein said diaphragm control means includes a sector gear rotatable in accordance with the movement thereof, and said restraining means further includes a pinion rotatable with said ratchet gear and having a smaller diameter than said ratchet gear, said sector gear engaging said pinion.

6. An automatic exposure control device as defined in claim 4, further comprising means for energizing said electromagnet means upon the actuation of said mirror driving member and wherein said electromagnet means is de-energized upon receipt of said signal, and said restraining means further includes an armature attractable by said electromagnet means to come into contact with the latter, lever means for bringing said pawl to a retracted position thereof when said armature is in contact with said electromagnet means, said lever means being urged to retract said armature from said electromagnet means and engage said pawl with said ratchet gear, and means for advancing said armature into contact with said electromagnet means before the commencement of the movement of said diaphragm control means.

7. An automatic exposure control device as defined in claim 6, further comprising a power source, a switch connected between said power source and said electromagnet means, and means for opening said switch when said armature is withdrawn from said electromagnet means so as to prevent re-energization of said electromagnet means.

8. An automatic exposure control device as defined in claim 7, further comprising an air damper connected to said diaphragm control means to retard the movement thereof.

9. An automatic exposure control device as defined in claim 1, wherein said light responsive means is a silicon photodiode.

10. An automatic exposure control device as defined in claim 1, further comprising means for manually setting the sensitivity of said film to be used, and wherein said light measuring circuit further includes means for generating an output commensurate with the set film-sensitivity so that the information of the set film-sensitivity is also included in said second output.

11. In a photographic camera including an automatic diaphragm control mechanism, a shutter member for effecting the film exposure and a release member for initiating the camera operation, said automatic diaphragm control mechanism comprising:

a diaphragm member delineating a diaphragm aperture;

a diaphragm control means movable from a cocked position to an advanced position in presonse to the operation of said release member, said diaphragm control means being intercoupled with said diaphragm member to open and close said diaphragm aperture in accordance with the position of said diaphragm member;

means for biasing said diaphragm control means to said advanced position thereof;

an intermediate means intercoupled with said diaphragm control means and biased to urge said intermediate means into operable engagement with said diaphragm control means in a direction opposite to the movement of said diaphragm control means from said cocked to said advanced position;

engaging means releasably engageable with said intermediate means to stop the movement of said intermediate means and thereby stop said diaphragm control means along its operating path of movement from said cocked to said advanced position;

electromagnetic means for releasably holding said engaging means in a disengaged position with said intermediate means;

an electric circuit including photoelectric means for generating a photoelectric output responsive to the scene brightness and diaphragm aperture size at the time the scene brightness is measured, and including a control circuit for effecting the release of said engaging means from said electromagnetic means in response to said photoelectric output; and a responsive means operable in response to the completion of said film exposure to return said diaphragm control means to the cocked position thereof, said diaphragm control means being engagable with said engaging means to release its engagement with said intermediate means immediately before said diaphragm control means reaches said cocked position.

12. The automatic diaphragm control mechanism of claim 11 further comprising operating means movable from a cocked to an advanced operating position thereof in response to the operation of said release member and being retracted to its cocked position by said responsive means in response to the termination of the film exposure, said diaphragm control means being coupled with said operating means to follow said operating means when it moves from said cocked to said advanced operating position and to be returned to its cocked position when said operating means moves from said advanced operating position to said cocked position thereof, whereby said diaphragm control means is retained at the cocked position thereof and is returned to its cocked position through said operating means.

13. The automatic diaphragm control mechanism of claim 12 wherein said intermediate means includes a first member interlocked with said diaphragm control means, a second member engageable by said engaging means and means for interconnecting said first and second members in the manner that the movement of said first member is transmitted to said second member in amplification relation.

14. The automatic diaphragm control mechanism of claim 12 wherein said diaphragm control means includes an arm interengagable with said diaphragm member and movable with said intermediate means and an acutating means coupled to and following said operating means and returnable thereby, said actuating means being intercoupled with said arm to accompany said arm when said actuating means follows said operating member and to move independently of said arm when said actuating means is returned by said operating member, said actuating means including means for releasing the engagement of said engaging means with said intermediate means immediately before said actuating member reaches its cocked position, and further including means for interlocking said actuating means with said intermediate means whereby the movement of said actuating means from the cocked to the advanced position thereof accompanies said intermediate means but the movement of said actuating means in the opposite direction if effected independently of said intermediate means.

15. The automatic diaphragm control mechanism of claim 11 wherein said engaging means includes an armature cooperable with said electromagnetic means for said releasable holding of said engaging means, said diaphragm control means at said cocked position thereof, urging said engaging means to position said armature in contact with said electromagnet.

* * * * *

UNITED STATES PATENT AND TRADEMARK OFFICE
CERTIFICATE OF CORRECTION

PATENT NO. : 4,142,787
DATED : March 6, 1979
INVENTOR(S) : Hiroshi Ueda and Akira Yoshizaki It is certified that error appears in the above-identified patent and that said Letters Patent are hereby corrected as shown below:

On the title page, item [30]

"Mar. 29, 1975 [JP] Japan ...............50-34745"

should read

-- Mar. 29, 1974 [JP] Japan .............49-34745 --.

Signed and Sealed this

Fifth Day of June 1979

[SEAL]

Attest:

RUTH C. MASON
Attesting Officer

DONALD W. BANNER
Commissioner of Patents and Trademarks